US009113351B2

(12) United States Patent
Cave et al.

(10) Patent No.: US 9,113,351 B2
(45) Date of Patent: *Aug. 18, 2015

(54) METHOD AND APPARATUS FOR PERFORMING INTER-FREQUENCY AND/OR INTER-RADIO ACCESS TECHNOLOGY MEASUREMENTS

(71) Applicant: InterDigital Patent Holdings, Inc., Wilmington, DE (US)

(72) Inventors: Christopher R. Cave, Montreal (CA); Joseph S. Levy, Merrick, NY (US); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,682

(22) Filed: Aug. 13, 2013

(65) Prior Publication Data

US 2013/0329589 A1 Dec. 12, 2013

Related U.S. Application Data

(63) Continuation of application No. 12/896,414, filed on Oct. 1, 2010, now Pat. No. 8,526,888.

(60) Provisional application No. 61/247,628, filed on Oct. 1, 2009.

(51) Int. Cl.
*H04B 17/00* (2006.01)
*H04W 24/02* (2009.01)
(Continued)

(52) U.S. Cl.
CPC .......... *H04W 24/02* (2013.01); *H04W 36/0083* (2013.01); *H04W 36/14* (2013.01)

(58) Field of Classification Search
USPC .............. 455/434, 435.2, 456.1, 456.2, 67.11
See application file for complete search history.

(56) References Cited

U.S. PATENT DOCUMENTS 7,729,315 B2 6/2010 Lindoff et al.
8,055,211 B2 11/2011 Chance et al.
(Continued)

FOREIGN PATENT DOCUMENTS

EP 2 242 300 10/2010
JP 2008136089 A2 6/2008
(Continued)

OTHER PUBLICATIONS

Third Generation Partnership Project, "Technical Specification Group Radio Access Network; Improved Network Controlled Mobility between E-UTRAN and 3GPP2/Mobile WiMAX Radio Technologies (Release 9)," 3GPP TR 36.938 V9.0.0 (Dec. 2009).
(Continued)

*Primary Examiner* — Temica M Beamer
(74) *Attorney, Agent, or Firm* — Volpe and Koenig, P.C.

(57) ABSTRACT

Techniques for performing inter-frequency and/or inter-radio access technology (RAT) measurements are disclosed. A multi-receiver wireless transmit/receive unit (WTRU) may receive downlink transmissions via a plurality of downlink carriers simultaneously. The WTRU may perform inter-frequency and/or inter-RAT measurements using an inactive receiver without measurement gaps if at least one receiver is inactive. If the WTRU receives a measurement order on a disabled carrier, the WTRU may perform measurements on the disabled carrier without measurement gaps using an inactive receiver while maintaining a status of the disabled carrier as disabled. The WTRU may perform the measurements autonomously if a trigger condition is met and at least one receiver is inactive. If all receivers are active, the WTRU may perform the measurements using measurement gaps, that may be configured on a downlink carrier, or alternatively, on an unpaired downlink carrier, or alternatively, on a subset of associated downlink uplink carrier pairs.

20 Claims, 10 Drawing Sheets

(51) Int. Cl.
*H04W 36/00* (2009.01)
*H04W 36/14* (2009.01)

(56) References Cited

U.S. PATENT DOCUMENTS

| | | |
|---|---|---|
| 8,639,239 B2 | 1/2014 | Uemura et al. |
| 2003/0021224 A1 | 1/2003 | Devitt |
| 2011/0039577 A1 | 2/2011 | Stern-Berkowitz et al. |
| 2011/0237202 A1 | 9/2011 | Uemura et al. |

FOREIGN PATENT DOCUMENTS

| | | |
|---|---|---|
| WO | 2005050850 A2 | 6/2005 |
| WO | 2009022976 A1 | 2/2009 |
| WO | 2009/045070 | 4/2009 |
| WO | 2009/132246 | 10/2009 |

OTHER PUBLICATIONS

Third Generation Partnership Project, "Technical Specification Group Radio Access Network; Improved Network Controlled Mobility between E-UTRAN and 3GPP2/Mobile WiMAX Radio Technologies," 3GPP TR 36.938 V8.0.0 (Mar. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.0.0 (Jun. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.4.0 (Jun. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.1.0 (Sep. 2009).

Third Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 8)3GPP TS 36.300 V8.10.0 (Sep. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).

LG Electronics Inc., "Neighbouring cell list organization," 3GPP TSG RAN WG2 #56, R2-063385, Riga, Latvia (Nov. 6-10, 2006).

METHOD AND APPARATUS FOR PERFORMING INTER-FREQUENCY AND/OR INTER-RADIO ACCESS TECHNOLOGY MEASUREMENTS

CROSS REFERENCE TO RELATED APPLICATIONS

This application is a continuation of U.S. patent application Ser. No. 12/896,414 filed Oct. 1, 2010, which claims the benefit of U.S. Provisional Application Ser. No. 61/247,628 filed Oct. 1, 2009, the contents of which are hereby incorporated by reference herein.

BACKGROUND

Dual-cell high speed downlink packet access (HSDPA) has been introduced in the third generation partnership project (3GPP) Release 8 as part of the continuing evolution of high speed packet access (HSPA) systems. This feature allows simultaneous downlink (DL) transmission and reception on two adjacent carriers on the high-speed channels. As part of 3GPP Release 9, the feature was extended to support DL transmission and reception on non-adjacent DL carriers, (e.g., carriers in different frequency bands). The ability to support simultaneous reception on non-adjacent carriers significantly impacts the radio frequency (RF) design of a wireless transmit/receive unit (WTRU) including separate RF receivers.

In order to support inter-frequency and inter-radio access technology (RAT) handovers, a WTRU performs measurements on other frequencies and/or other RATs and report the measurements to the radio access network. In case where a WTRU is equipped with a single RF receiver, the WTRU performs the inter-frequency and/or inter-RAT measurements during the measurement gaps. During the measurement gaps, a downlink transmission to the WTRU is interrupted, and the WTRU is allowed to tune its RF receiver to other frequencies and/or RATs to perform the inter-frequency and/or inter-RAT measurements. In 3GPP universal mobile telecommunication systems (UMTS) wireless communications systems, these measurements gaps are referred to as compressed mode (CM) gaps. In accordance with the current 3GPP UMTS specification, both the DL reception and the UL transmission are interrupted during the CM gaps, which causes a degradation of service.

SUMMARY

A method and apparatus for performing inter-frequency and/or inter-radio access technology (RAT) measurements are disclosed. A multi-receiver wireless transmit/receive unit (WTRU) may receive downlink transmissions via a plurality of downlink carriers simultaneously. The WTRU may perform inter-frequency and/or inter-RAT measurements using an inactive receiver without measurement gaps if at least one receiver is inactive. If the WTRU receives a measurement order on a disabled carrier, the WTRU may perform measurements on the disabled carrier without measurement gaps using an inactive receiver while maintaining a status of the disabled carrier as disabled at a physical layer. The WTRU may perform the performing the inter-frequency and/or inter-RAT measurements autonomously on a condition that the trigger condition is met and at least one receiver is inactive. If all receivers are active, the WTRU may perform the measurements using measurement gaps, wherein the measurement gaps may be configured on a downlink carrier and not on an uplink carrier, or alternatively, on an unpaired downlink carrier and not on a paired downlink carrier, or alternatively, on a subset of associated downlink uplink carrier pairs.

The WTRU may send a proximity indication on a condition that the WTRU is near a detected home Node-B (HNB)/evolved HNB (eHNB) cell whose identity is in a list, and perform inter-frequency and/or inter-RAT measurements on a frequency carrier or an RAT of the detected HNB/eHNB cell while configuring with at least one receiver inactive and/or autonomous gaps.

BRIEF DESCRIPTION OF THE DRAWINGS

A more detailed understanding may be had from the following description, given by way of example in conjunction with the accompanying drawings wherein.

DETAILED DESCRIPTION

Figure 1A:
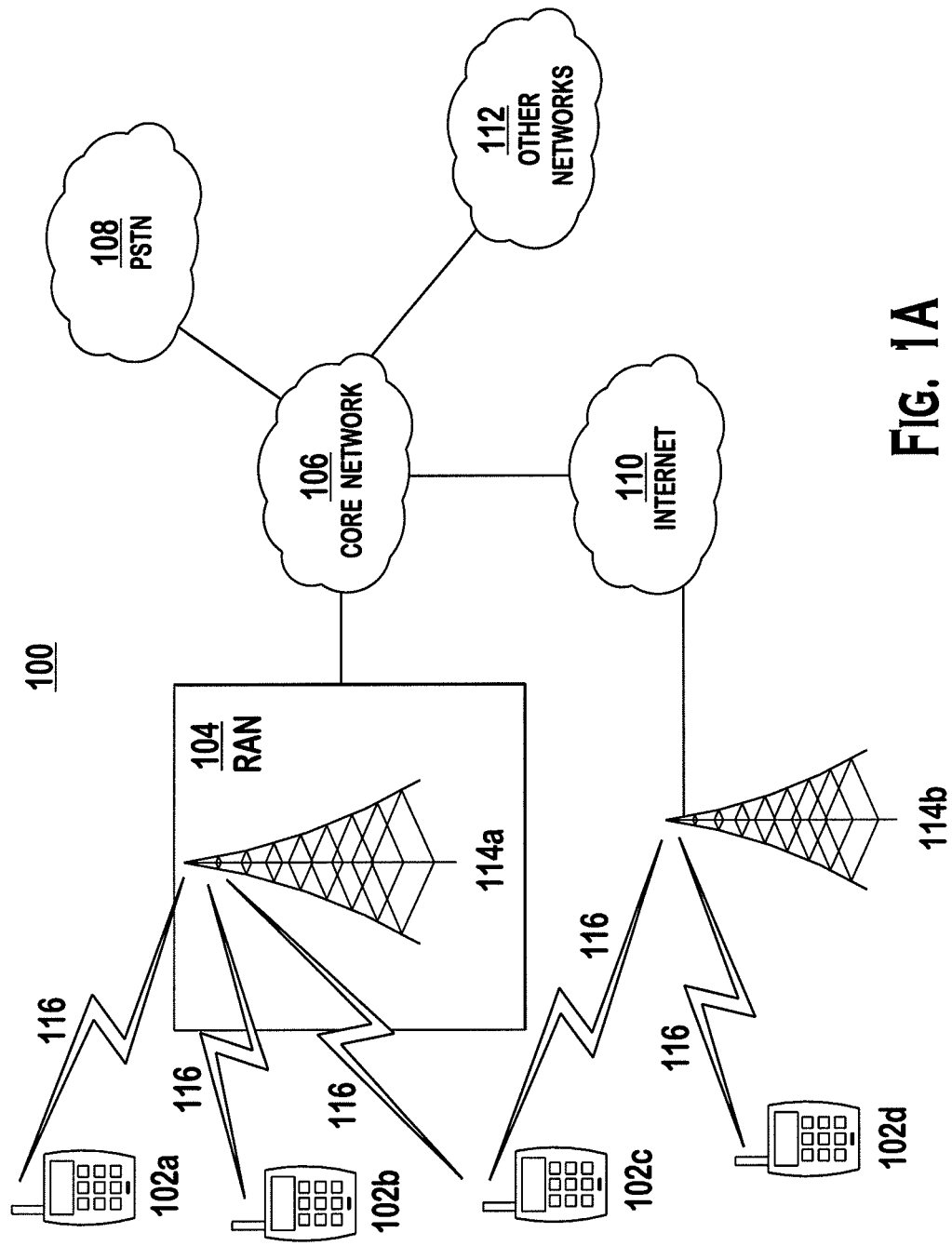
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
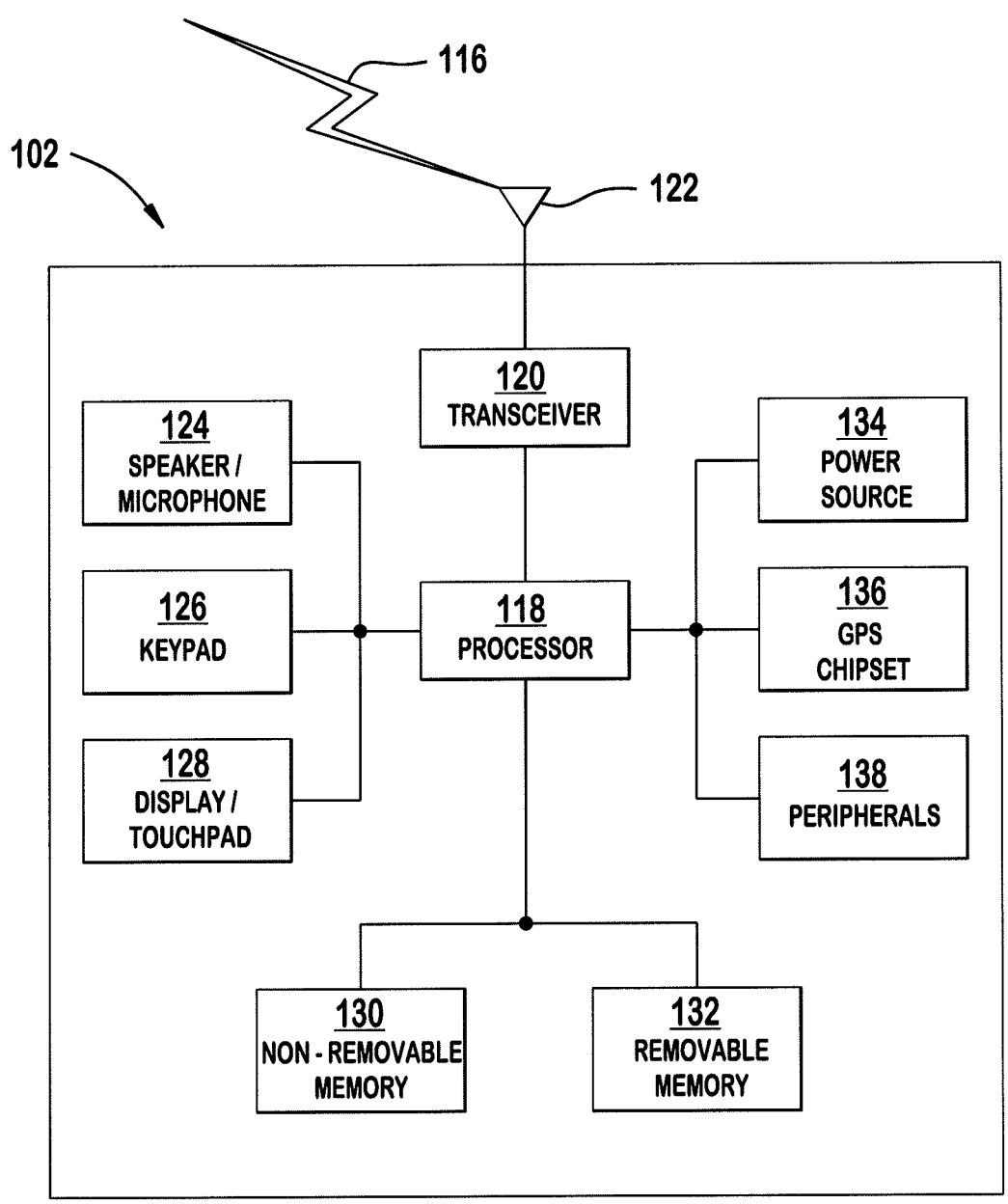
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver unit 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example. For example, the transceiver 120 may at least one RF transmitter and a plurality of RF receivers so that the WTRU 102 may receive on two or more adjacent or non-adjacent frequency carriers simultaneously. This multi-receiver capability may be realized by implementing multiple independent RF receivers, or by using a single advanced RF receiver which is capable of processing multiple carriers, or by any other means.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
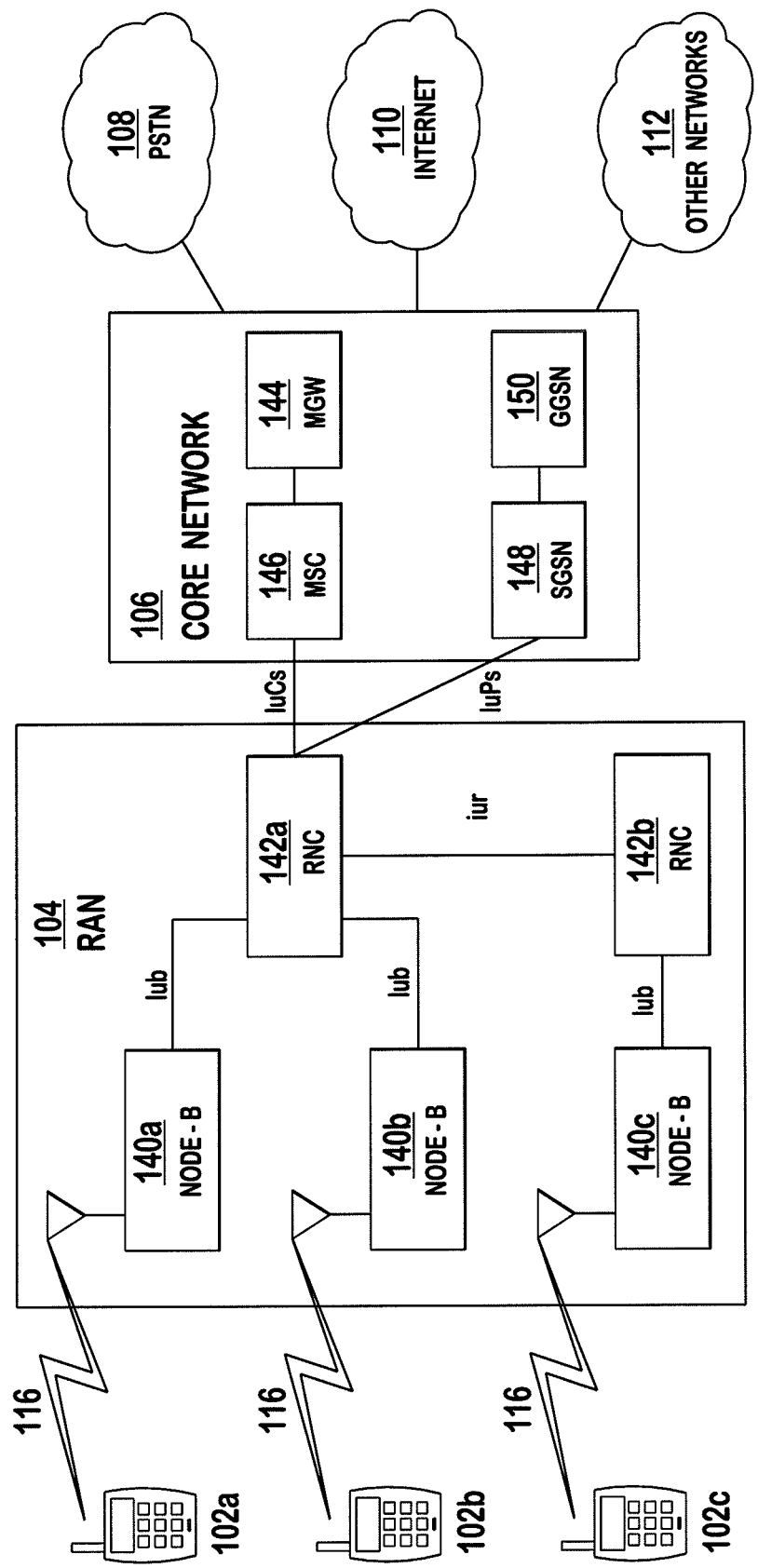
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Hereafter, the embodiments will be described in the context of 3GPP UMTS wireless communication systems. However, it should be noted that the embodiments are applicable to any wireless technologies where inter-frequency and/or inter-RAT measurements are performed to support mobility including, but not limited to, long term evolution (LTE), LTE-Advanced (LTE-A), WiMax, and any other wireless communication systems.

Hereafter, the terminology "multi-receiver WTRU" will be used to describe a WTRU that is capable of reception on two or more adjacent or non-adjacent frequency carriers simultaneously. On the transmit side, the multi-receiver WTRU may have a capability of transmission either on a single frequency carrier or on two or more adjacent or non-adjacent frequency carriers simultaneously. This multi-receiver capability may be realized by implementing multiple independent RF receivers, or by using a single advanced RF receiver which is capable of processing multiple carriers, or by any other means. Hereafter, the terminology "receiver" will be used to describe a capability of the multi-receiver WTRU for receiving and processing a single carrier either by an independent RF receiver or by a single advanced receiver.

Embodiments for performing inter-frequency and/or inter-RAT measurements where all receivers of the multi-receiver WTRU are active are explained hereafter. One example of this case is when a dual-band dual-cell HSDPA capable WTRU with two receivers is configured to receive on two downlink carriers that are either adjacent or non-adjacent.

Figure 2:
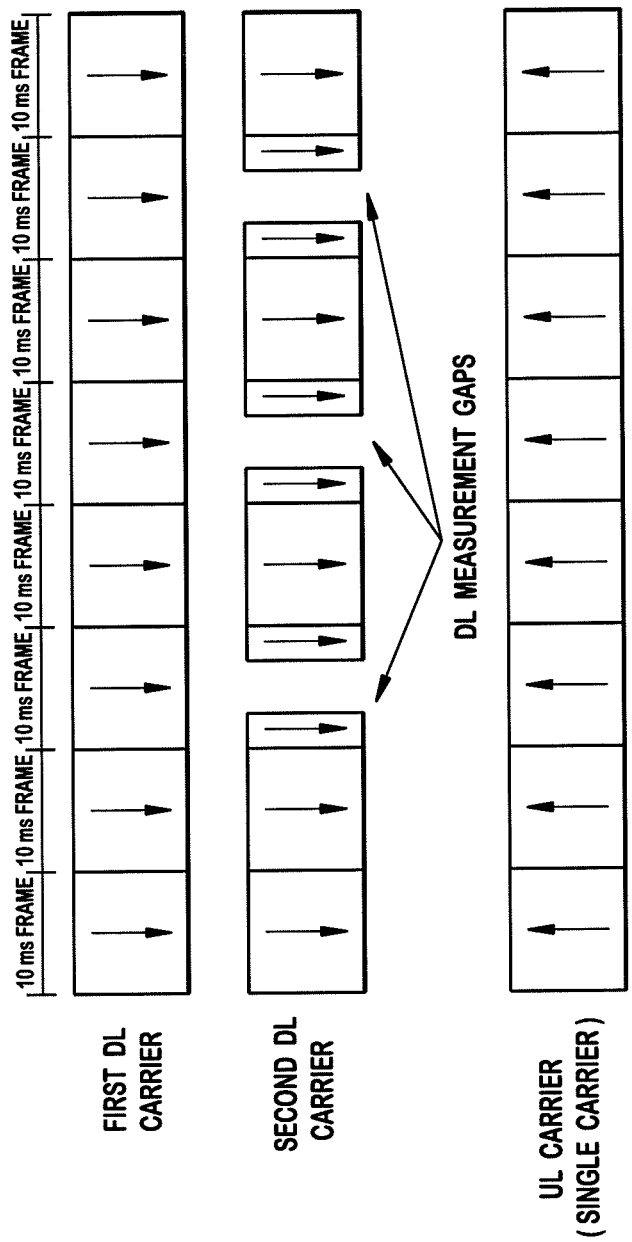
FIG. 2 shows an example downlink (DL) and uplink (UL) carrier configuration with measurement gaps on the DL carrier in accordance with one embodiment.

In accordance with one embodiment, if at least one DL carrier is configured without an associated UL carrier, the measurement gaps, (e.g., compressed mode (CM) gaps), may be configured on the DL, without any gap or interruption on the UL. FIG. 2 shows an example DL and UL carrier configuration with measurement gaps on the DL carrier in accordance with this embodiment. In this example, a WTRU is configured with two DL carriers and one UL carrier. The WTRU includes two receivers and both receivers are active to process the two DL carriers. The first DL carrier is associated with the single UL carrier, and the second DL carrier is an unpaired carrier. As shown in FIG. 2, the measurement gaps may be configured on the unpaired DL carrier, without any measurement gaps on the UL carrier. Alternatively, the measurement gaps may be configured both on the paired DL carrier and its associated UL carrier, but not on the unpaired DL. Additionally, it is possible that measurements gaps may be configured on all of the DL and UL carriers or any allowable subset of carriers. During the DL measurement gaps, the WTRU may perform inter-frequency and/or inter-RAT measurements and the Node-B may not schedule any transmissions to the WTRU on the DL carrier(s) on which the measurement gaps are configured.

In accordance with another embodiment, if a measurement gap is configured for a DL carrier that has an associated UL carrier, the measurement gaps may be applied to both the UL and DL carriers, (e.g., CM gaps are applied to the UL carrier as well), but the measurement gaps may not be applied to all carriers, (i.e., on a subset of associated downlink uplink carrier pairs).

Figure 3:
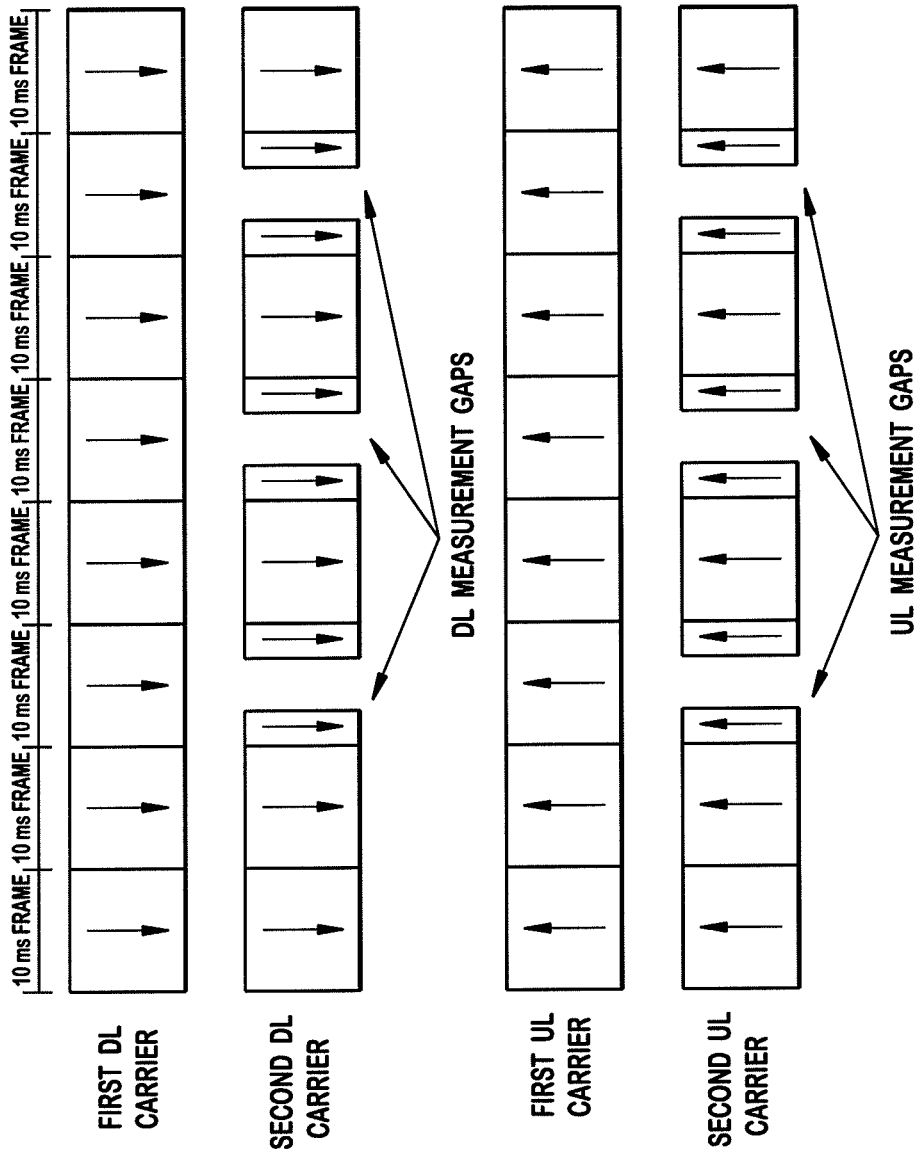
FIG. 3 shows an example DL and UL carrier configuration with measurement gaps on the DL carrier in accordance with another embodiment.

FIG. 3 shows an example DL and UL carrier configuration with measurement gaps on the DL carrier in accordance with this embodiment. In this example, a WTRU is configured with two DL carriers and two UL carriers. The WTRU includes two receivers and both receivers are active to process the two DL carriers. The first DL carrier is associated with the first UL carrier, and the second DL carrier is associated with the second UL carrier. The measurement gaps are configured on the second DL carrier, and the WTRU may not transmit during the measurement gaps on the associated UL carrier, (i.e., the second UL carrier in this example).

During the measurement gaps, a WTRU may perform inter-frequency and/or inter-RAT measurements. The Node-B may not schedule any transmissions to the WTRU on the carrier(s) on which the measurement gaps are configured. The WTRU may apply the conventional CM mode procedures to the associated UL carrier and not transmit during the measurement gaps.

Figure 4:
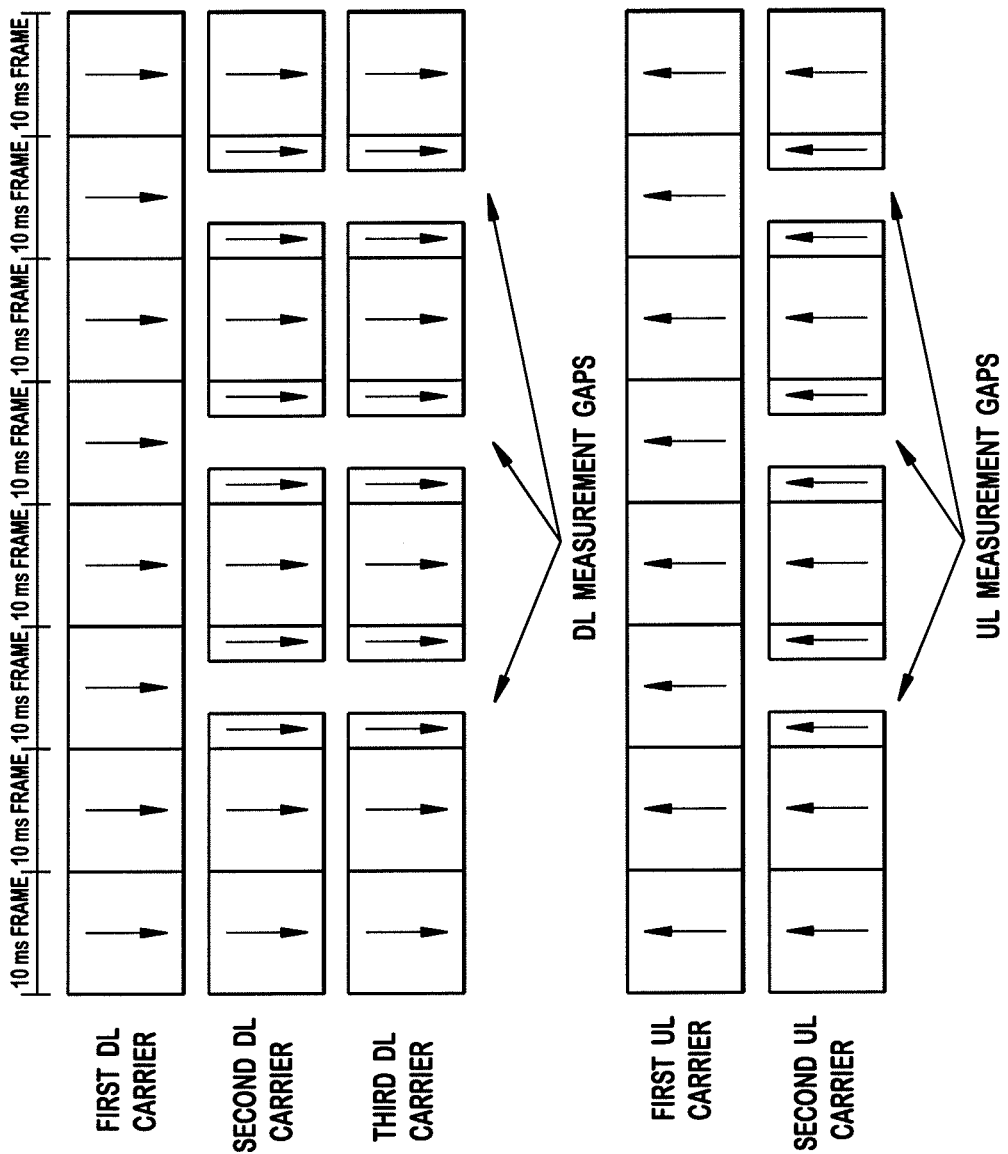
FIG. 4 shows an example DL and UL carrier configuration with measurement gaps on the DL carrier in accordance with an alternative embodiment.

A combination of the above two embodiments may be implemented in case where multiple DL carriers are configured for measurement gaps and at least one DL carrier has an associated UL carrier and at least one DL carrier does not. FIG. 4 shows an example DL and UL carrier configuration with measurement gaps on the DL carrier in accordance with an alternative embodiment. In this example, a WTRU is configured with three DL carriers and two UL carriers. The WTRU includes three receivers and all receivers are active to process the three DL carriers. The first DL carrier is associated with the first UL carrier, the second DL carrier is associated with the second UL carrier, and the third DL carrier is unpaired. The measurement gaps are configured on the second and third DL carriers, and the WTRU may not transmit during the measurement gaps on the second UL carrier, which is associated with the second DL carrier.

For all of the embodiments above, the WTRU may determine the carrier(s) configured for measurement gaps based on an explicit or implicit indication from the network. The indication may be received via a higher layer configuration message for configuring the measurement gaps, (e.g., radio resource control (RRC) message that carries the CM gap configuration information).

Alternatively, the carrier(s) selected for the measurement gaps may be predetermined. For example, upon configuration of a measurement gap, the WTRU may apply the measurement gaps to a predetermined carrier, (e.g., a supplementary (or secondary) carrier(s)), keeping other UL and DL carriers, (e.g., an anchor (or primary) carrier(s)), in full transmission and reception mode. The anchor (or primary) carrier may be defined as a carrier that carries a specific set of control information for downlink/uplink transmissions. Any carrier that is not assigned as an anchor (or primary) carrier may be a supplementary (or secondary) carrier.

In case where multiple carriers may be selected for measurement gaps, the carriers may be determined based on a pre-defined pairing rule. For example, if two adjacent carriers are configured in two different frequency bands, respectively, (i.e., total four carriers are configured), the measurement gaps may be applied to all carriers within a specified frequency band, (e.g., the two adjacent carriers in one of the frequency bands in this example).

The WTRU may be indicated to start performing the inter-frequency and/or inter-RAT measurements on a particular carrier by disabling that carrier. Disabling of the carrier(s) may be indicated to the WTRU, for example, via a high speed shared control channel (HS-SCCH) order or higher layer signaling, (e.g., RRC message), or any type of signaling or message at any potocol layer. In case where a particular DL carrier(s) is disabled, the WTRU may stop reception on the disabled carrier(s) and perform inter-frequency and/or inter-RAT measurements using the available receiver which were used for the disabled carrier(s).

Embodiments for performing inter-frequency and/or inter-RAT measurements where at least one receiver of the multi-receiver WTRU is inactive are explained hereafter. One example of this case is when a dual-band dual-cell HSDPA capable WTRU with two receivers is configured to operate with single carrier HSDPA.

In accordance with one embodiment, no measurement gaps may be configured for the active receiver(s), and a WTRU may use the inactive receiver(s) to perform the inter-frequency and/or inter-RAT measurements. The WTRU may perform the inter-frequency and/or inter-RAT measurements continuously using the inactive receiver. In this case, no measurement gaps may be configured for performing the inter-frequency and/or inter-RAT measurements.

Since the carrier activation and deactivation is controlled by the Node-B, (e.g., via physical layer signaling, such as HS-SCCH order), and the measurement gaps are scheduled by the radio network controller (RNC) through an RRC message, the WTRU may receive the inter-frequency and/or inter-RAT measurement order from the RNC on the disabled carrier. In case where a DL carrier has been disabled and the WTRU receives an indication with measurement gaps configuration to perform the inter-frequency and/or inter-RAT measurements on the disabled carrier, the WTRU may maintain the state of the carrier as "disabled" at a physical layer (L1), and perform the inter-frequency and/or inter-RAT measurements without any measurement gaps using the receiver which had previously been associated with that carrier or any other available receiver (a receiver not assigned to an active channel).

If the disabled carrier is re-activated, (e.g., through L1 signaling such as an HS-SCCH order, or any other signaling or message), so that all receivers become active, while the WTRU is scheduled to perform the inter-frequency and/or inter-RAT measurements on that disabled carrier, the WTRU may activate the DL reception and/or UL transmission on that disabled carrier(s), and may perform the inter-frequency and/or inter-RAT measurements in accordance with any one of the embodiments disclosed above for the case where all receivers are active.

In order to reduce the signalling load, the network may preset a threshold(s) and a timer(s) and configure events for starting and reporting the inter-frequency and/or inter-RAT measurements such that a WTRU may autonomously start and report the inter-frequency and/or inter-RAT measurements when at least one receiver is inactive. In this embodiment, the WTRU may autonomously start the inter-frequency and/or inter-RAT measurements once the triggering condition(s) is met, and may not inform the network about losing signal quality of the serving cell or the like in order to get an inter-frequency/inter-RAT measurement order with or without measurement gaps, thus speeding up the measurements order/reporting cycle.

Figure 5A:
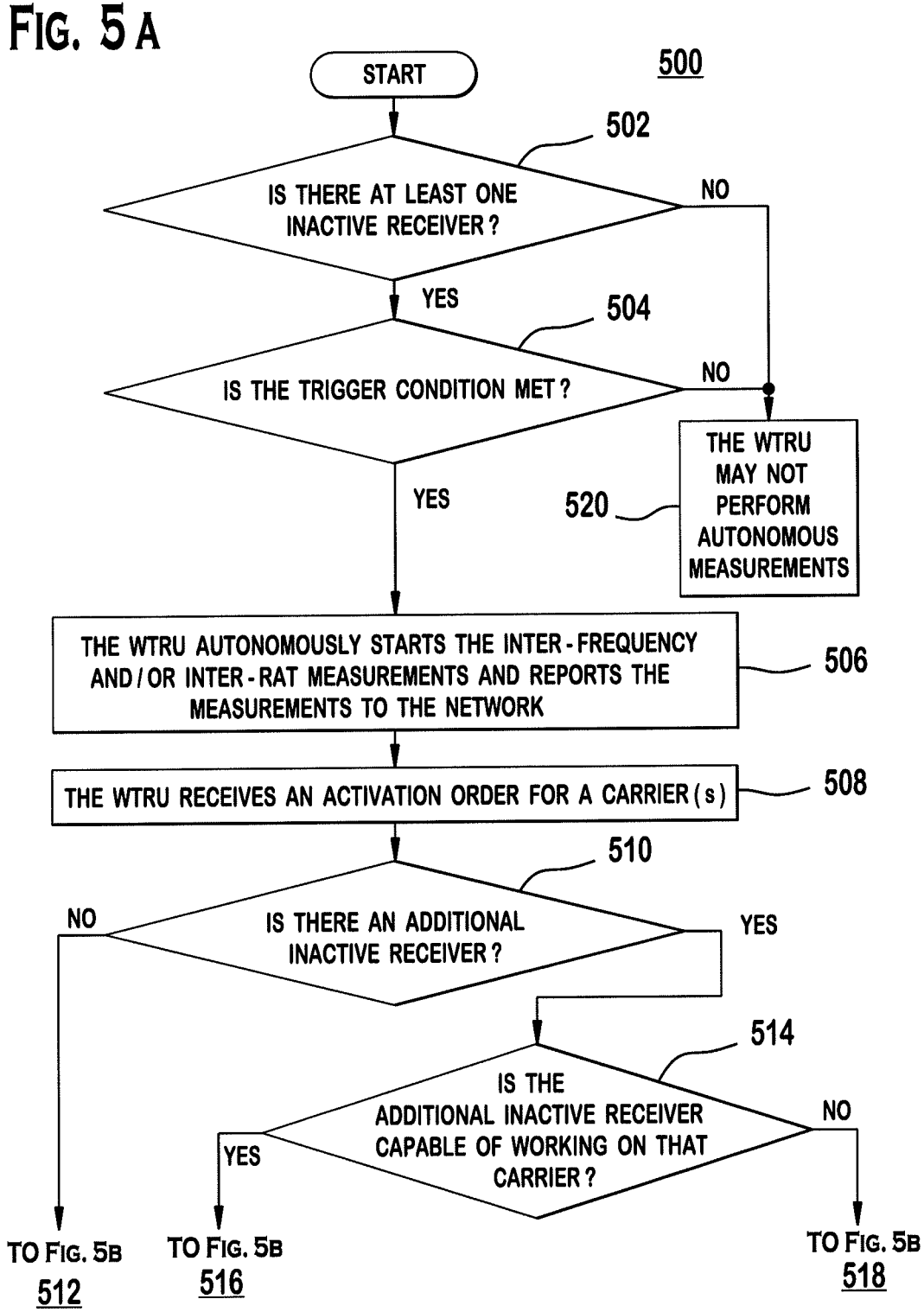
FIGS. 5A and 5B is a flow diagram of an example process for autonomous inter-frequency and/or inter-RAT measurements in accordance with one embodiment.
Figure 5B:
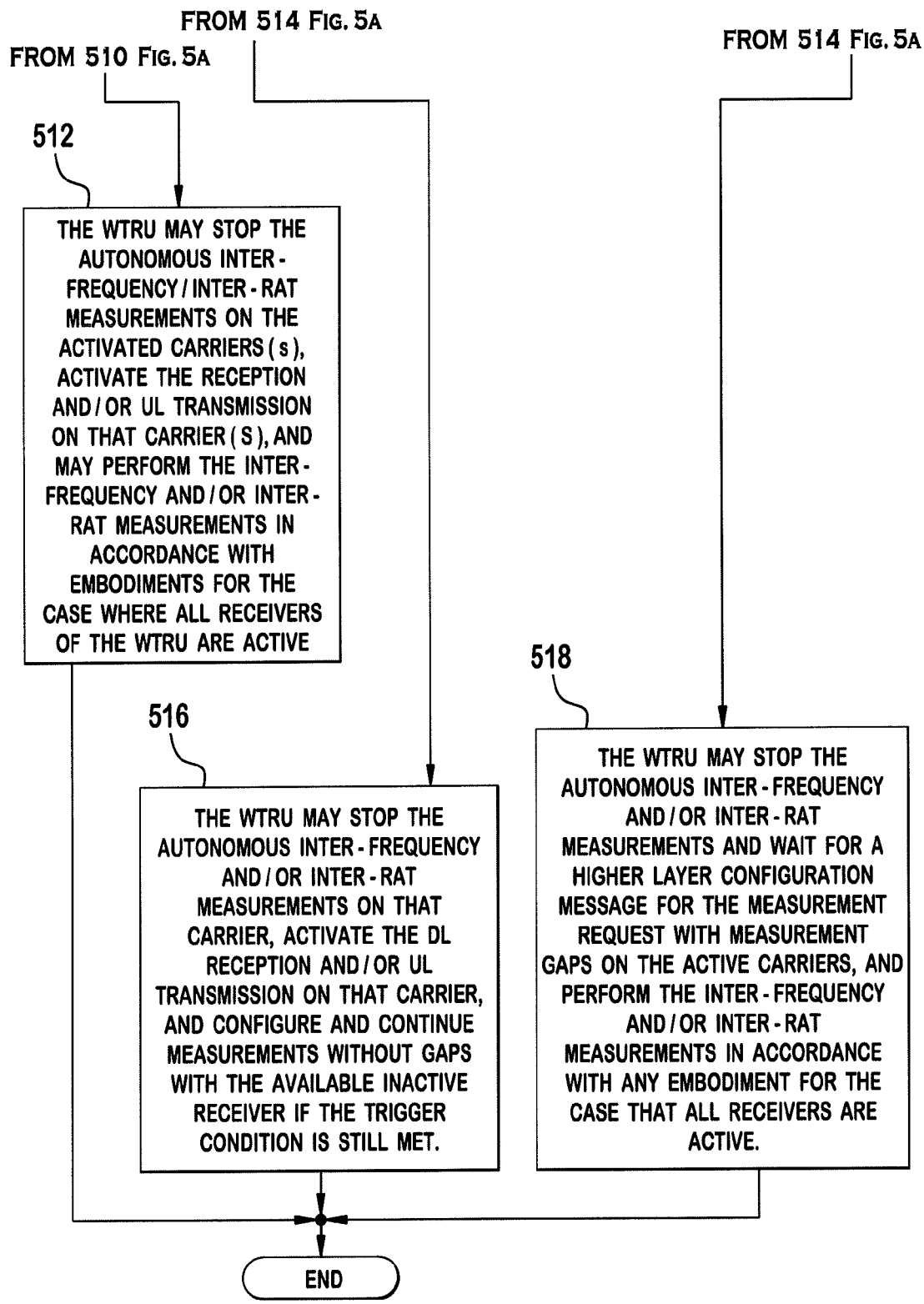

FIGS. 5A and 5B is a flow diagram of an example process 500 for autonomous inter-frequency and/or inter-RAT measurements in accordance with one embodiment. A WTRU determines whether there is at least one inactive receiver (502). If so, the WTRU determines whether a trigger condition(s) is met (504). If either there is no inactive receiver or the trigger condition(s) is not met, the WTRU may not perform the autonomous measurements (520). If there is at least one inactive receiver and the trigger condition(s) is met, the WTRU may autonomously start the inter-frequency and/or inter-RAT measurements and report the measurements to the network (506). If the WTRU receives an activation order for a carrier(s) (508) and there is no inactive receiver (510), the WTRU may stop the autonomous inter-frequency/inter-RAT measurements on the activated carrier(s), activate the reception and/or UL transmission on that carrier(s), and may perform the inter-frequency and/or inter-RAT measurements in accordance with any one of the embodiments described above for the case where all receivers of the WTRU are active (512).

If there is additional inactive receiver (510), it is determined whether the additional inactive receiver is capable of working on that carrier (514). If the determination at 514 is positive, the WTRU may stop the autonomous inter-frequency and/or inter-RAT measurements on that carrier, activate the DL reception and/or UL transmission on that carrier, and configure and continue measurements without measurement gaps with the available inactive receiver if the trigger condition is still met (516).

If the determination at 514 is negative, the WTRU may stop the autonomous inter-frequency and/or inter-RAT measurements and wait for a higher layer configuration message for the measurement request with measurement gaps on the active carriers, and perform the inter-frequency and/or inter-RAT measurements in accordance with any one of the embodiments disclosed above for the case that all receivers are active (518).

A home Node-B (HNB) or an evolved HNB (eHNB) may be deployed at customer premises to off-load traffics from the macro Node-B and provide a better link quality and performance. An access to the HNB/eHNB is based on the HNB/eHNB cell identity, called closed subscriber group (CSG) identity (ID). For supporting mobility from the macro Node-B to the HNB or eHNB, a WTRU may send a proximity indication to the network when the WTRU detects that it is near a HNB/eHNB cell whose CSG ID is in the list provided by the network. The proximity indication may include the RAT and the frequency of the detected HNB/eHNB cell. After receiving the proximity indication, the network, (e.g., radio network controller (RNC)), may configure measurement on the reported carrier or RAT to measure the HNB/eHNB cell. Measurement gaps, (e.g., CM gaps), may be activated to allow the WTRU to perform the measurements on the reported frequency and RAT. The WTRU sends a measurement report to the network, and the network may configure the WTRU to perform system information (SI) acquisition and report SI. The WTRU may perform SI acquisition using autonomous gaps. The autonomous gaps are scheduled by the WTRU. The WTRU may suspend reception and transmission with the serving cell to acquire the relevant SI from the target HNB/eHNB.

Figure 6A:
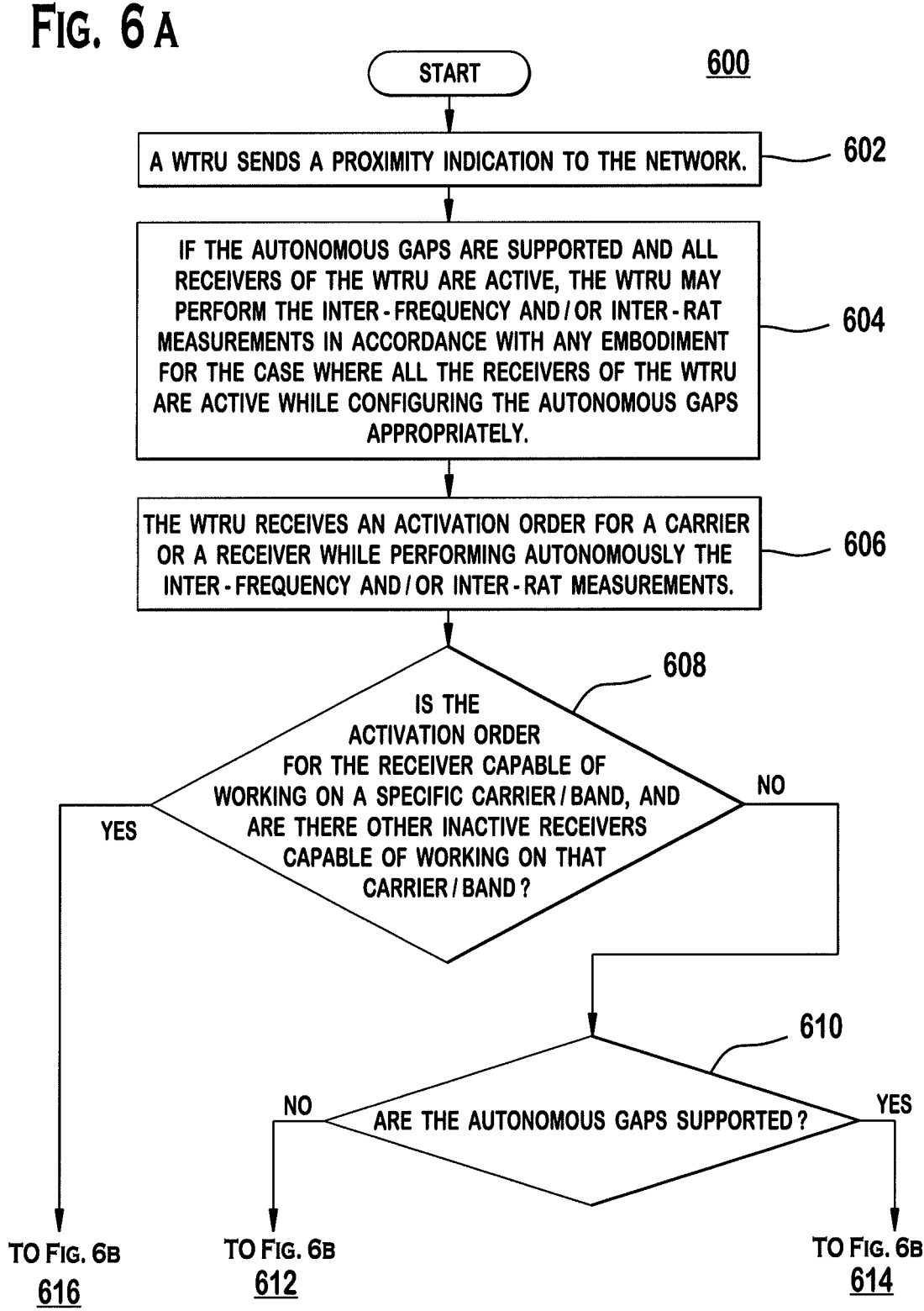
FIGS. 6A and 6B is a flow diagram of an example process for performing inter-frequency and/or inter-RAT measurements in accordance with another embodiment.
Figure 6B:
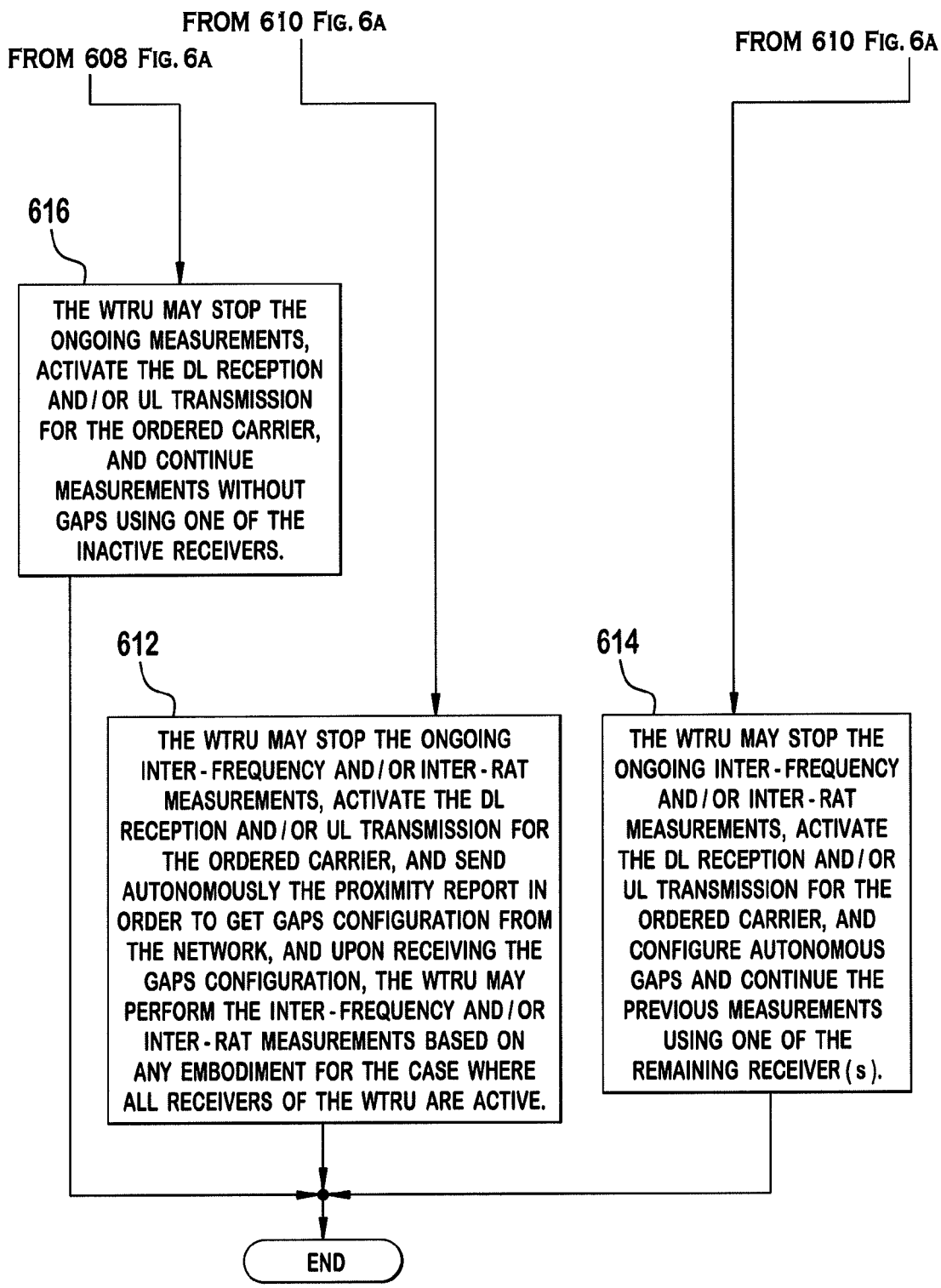

In accordance with one embodiment, in case the WTRU is capable of performing an autonomous search for a Node-B, (e.g., an HNB or eHNB detection), the inter-frequency and/or inter-RAT measurements may be started manually by the user. FIGS. 6A and 6B is a flow diagram of an example process 600 for performing measurements in accordance with one embodiment. A WTRU sends a proximity indication to the network when the WTRU detects that it is near a HNB/eHNB cell whose CSG ID is in the WTRU's list provided by the network (602). After sending the proximity indication to the Node-B, the WTRU may wait for gaps configuration from the network. If the autonomous gaps are supported and all receivers of the WTRU are active, the WTRU may perform the inter-frequency and/or inter-RAT measurements in accordance with any embodiments disclosed above for the case where all the receivers of the WTRU are active while configuring the autonomous gaps appropriately (604). If one or more receivers are available, no measurement gaps may be required to start the inter-frequency and/or inter-RAT measurements.

The WTRU receives an activation order for a carrier or a receiver while performing autonomously the inter-frequency and/or inter-RAT measurements (606). It is determined whether the activation order is for the receiver capable of working on a specific carrier/band, and whether other inactive receivers are capable of working on that carrier/band (608).

If the determination at 608 is negative, it is further determined whether the autonomous gaps are supported (610). If it is determined so at step 610, the WTRU may stop the ongoing inter-frequency and/or inter-RAT measurements, activate the DL reception and/or UL transmission for the ordered carrier, send autonomously the proximity report in order to get measurement gaps configuration from the network, and upon receiving the gaps configuration, the WTRU may perform the inter-frequency and/or inter-RAT measurements based on any one of the embodiments disclosed above for the case where all receivers of the WTRU are active (612).

If the autonomous gaps are supported (610), the WTRU may stop the ongoing inter-frequency and/or inter-RAT measurements, activate the DL reception and/or UL transmission for the ordered carrier, and configure autonomous gaps and continue the previous measurements using one of the remaining receiver(s) (614).

If the determination at 608 is positive, the WTRU may stop the ongoing measurements, activate the DL reception and/or UL transmission for the ordered carrier, and continue measurements without gaps using one of the inactive receivers (616).

The WTRU may indicate to the network its multi-receiver capability, (e.g., capability of performing inter-frequency and/or inter-RAT measurements while continuing transmission and reception on one or more carriers). The WTRU may include a new capability information element in a higher layer signaling, (e.g., RRC message), to indicate the specific multi-receive capability.

Alternatively, the network may infer that the WTRU has such multi-receiver capability from other capability indications of the WTRU. For example, the network may infer that all WTRUs indicating support of dual-band dual-cell HSDPA are also capable of performing inter-frequency and/or inter-RAT measurements while continuing transmission and reception on other carrier(s). Alternatively, a new WTRU-class may be defined for WTRUs having the multi-receiver capability.

The multi-receiver capability may not be supported at all times by the network, and the network may selectively activate and deactivate the multi-receiver capability of the WTRU. In accordance with one embodiment, a WTRU may operate as required by the default mode, (e.g., as required in the 3GPP Release 8), unless instructed otherwise by the network. If the WTRU is instructed to operate with the multi-receiver capability by the network, the WTRU may operate in accordance with any embodiment disclosed herein.

Alternatively, a new type of configuration command, (e.g., an RRC message), may be defined to configure the WTRU to operate in accordance with any one of the embodiments disclosed herein such that once a WTRU receives this new type of configuration command, the WTRU may perform the inter-frequency and/or inter-RAT measurements and related operations in accordance with the embodiments disclosed herein. Alternatively, the network may send an activation command, (e.g., via RRC message), to enable the WTRU to operate in accordance with the embodiments disclosed herein.

After handover to a target cell, the inter-frequency and/or inter-RAT measurements and the related operations in accordance with any embodiment disclosed herein may not be supported at the target cell. In accordance with one embodiment, the WTRU may revert to the default mode, (e.g., the operation in accordance with the 3GPP Release 8), until the WTRU is instructed otherwise. Alternatively, the handover command may contain the necessary configuration information, and the WTRU may configure itself as directed by the handover command. Alternatively, the WTRU may be network-aware and configure itself based on the capabilities of the serving Node-B.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method implemented in a multi-receiver wireless transmit/receive unit (WTRU) for performing inter-frequency and/or inter-radio access technology (RAT) measurements, the method comprising:
   determining whether to use either an inactive receiver or measurement gaps for inter-frequency and/or inter-RAT measurements based on an activation status of carriers at a physical layer; and
   performing inter-frequency and/or inter-RAT measurements using either an inactive receiver or measurement gaps based on the determination.

2. The method of claim 1 wherein the inter-frequency and/or inter-RAT measurements are performed using an inactive receiver without configuring measurement gaps on a condition that at least one inactive receiver is available.

3. The method of claim 2 wherein the inter-frequency and/or inter-RAT measurements are scheduled autonomously by the WTRU.

4. The method of claim 1 further comprising:
receiving a measurement order on a disabled carrier, wherein the inter-frequency and/or inter-RAT measurements are performed using an inactive receiver on the disabled carrier without measurement gaps while maintaining a status of the disabled carrier as disabled at the physical layer.

5. The method of claim 1 wherein the inter-frequency and/or inter-RAT measurements are performed using measurement gaps on a condition that there is no inactive receiver available.

6. The method of claim 5 wherein the measurement gaps are configured on a downlink carrier and not on an uplink carrier.

7. The method of claim 5 wherein the measurement gaps are configured on an unpaired downlink carrier and not on a paired downlink carrier.

8. The method of claim 5 wherein the measurement gaps are configured on a subset of associated downlink-uplink carrier pairs.

9. The method of claim 1 further comprising:
determining whether a trigger condition for the inter-frequency and/or inter-RAT measurements is met, wherein the inter-frequency and/or inter-RAT measurements are performed on a condition that the trigger condition is met.

10. The method of claim 1 further comprising:
detecting a home Node-B (HNB) cell or a home evolved HNB (eHNB) cell;
sending a proximity indication on a condition that an identity of the detected HNB or eHNB cell is in a list that the WTRU received from a network; and
performing the inter-frequency and/or inter-RAT measurements on a frequency carrier or an RAT of the detected HNB or eHNB cell.

11. A multi-receiver wireless transmit/receive unit (WTRU) for performing inter-frequency and/or inter-radio access technology (RAT) measurements, the WTRU comprising:
a receiver configured to receive via at least two downlink carriers simultaneously; and
a processor configured to determine whether to use either an inactive receiver or measurement gaps for inter-frequency and/or inter-RAT measurements based on an activation status of carriers at a physical layer, and perform inter-frequency and/or inter-RAT measurements using either an inactive receiver or measurement gaps based on the determination.

12. The WTRU of claim 11 wherein the processor is configured to perform the inter-frequency and/or inter-RAT measurements using an inactive receiver without configuring measurement gaps on a condition that at least one inactive receiver is available.

13. The WTRU of claim 12 wherein the processor is configured to schedule the inter-frequency and/or inter-RAT measurements autonomously.

14. The WTRU of claim 11 wherein the processor is configured to receive a measurement order on a disabled carrier, and perform the inter-frequency and/or inter-RAT measurements using an inactive receiver on the disabled carrier without measurement gaps while maintaining a status of the disabled carrier as disabled at the physical layer.

15. The WTRU of claim 11 wherein the processor is configured to perform the inter-frequency and/or inter-RAT measurements using measurement gaps on a condition that there is no inactive receiver available.

16. The WTRU of claim 15 wherein the measurement gaps are configured on a downlink carrier and not on an uplink carrier.

17. The WTRU of claim 15 wherein the measurement gaps are configured on an unpaired downlink carrier and not on a paired downlink carrier.

18. The WTRU of claim 15 wherein the measurement gaps are configured on a subset of associated downlink uplink carrier pairs.

19. The WTRU of claim 11 wherein the processor is configured to determine whether a trigger condition for the inter-frequency and/or inter-RAT measurements is met, and perform the inter-frequency and/or inter-RAT measurements on a condition that the trigger condition is met.

20. The WTRU of claim 11 wherein the processor is configured to detect a home Node-B (HNB) cell or a home evolved HNB (eHNB) cell, send a proximity indication on a condition that an identity of the detected HNB or eHNB cell is in a list that the WTRU received from a network, and perform the inter-frequency and/or inter-RAT measurements on a frequency carrier or an RAT of the detected HNB or eHNB cell.

* * * * *